United States Patent
Egawa et al.

(10) Patent No.: US 7,195,306 B2
(45) Date of Patent: Mar. 27, 2007

(54) FLOOR STRUCTURE OF VEHICLE BODY

(75) Inventors: Yasuhisa Egawa, Wako (JP); Shigeto Yasuhara, Wako (JP); Toshiaki Sato, Wako (JP); Akihisa Kudoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/279,175

(22) Filed: Apr. 10, 2006

(65) Prior Publication Data
US 2006/0232105 A1    Oct. 19, 2006

(30) Foreign Application Priority Data
Apr. 15, 2005 (JP) .............................. 2005-117951
Apr. 19, 2005 (JP) .............................. 2005-120520

(51) Int. Cl.
*B62D 25/20* (2006.01)
(52) U.S. Cl. .............................. 296/187.08; 296/193.07
(58) Field of Classification Search ........... 296/187.08, 296/193.07, 209, 199, 204, 29, 30, 205
See application file for complete search history.

(56) References Cited

U.S. PATENT DOCUMENTS

| | | | |
|---|---|---|---|
| 4,402,545 A | | 9/1983 | Utsunomiya et al. |
| 5,362,120 A | * | 11/1994 | Cornille, Jr. ............ 296/203.01 |
| 5,388,885 A | * | 2/1995 | Warren .................. 296/203.03 |
| 5,567,005 A | * | 10/1996 | Kosuge et al. .............. 296/204 |
| 6,003,898 A | * | 12/1999 | Teply et al. ................. 280/785 |
| 6,416,117 B1 | * | 7/2002 | Weiman ..................... 296/204 |
| 6,648,401 B2 | * | 11/2003 | Behnke et al. .............. 296/198 |
| 7,011,359 B2 | * | 3/2006 | Watanabe et al. ....... 296/187.08 |
| 2003/0034673 A1 | * | 2/2003 | Sugihara et al. ............ 296/204 |
| 2004/0174046 A1 | * | 9/2004 | Kamura et al. ......... 296/193.07 |
| 2005/0046236 A1 | * | 3/2005 | Nakamura et al. ..... 296/193.07 |
| 2005/0116507 A1 | * | 6/2005 | Kamura et al. ........ 296/193.07 |
| 2005/0189791 A1 | * | 9/2005 | Chernoff et al. ....... 296/193.07 |
| 2005/0248185 A1 | * | 11/2005 | Hayashi ................. 296/193.07 |
| 2006/0061143 A1 | * | 3/2006 | Okana et al. ............... 296/204 |

FOREIGN PATENT DOCUMENTS

| | | | | | |
|---|---|---|---|---|---|
| JP | 401237269 A | * | 9/1989 | ................. | 296/204 |
| JP | 405262263 A | * | 10/1993 | ................. | 296/209 |
| JP | 6-107234 | | 4/1994 | | |
| JP | 2004-314729 | | 11/2004 | | |

\* cited by examiner

*Primary Examiner*—Jason Morrow
(74) *Attorney, Agent, or Firm*—Rankin, Hill, Porter & Clark LLP

(57) ABSTRACT

A floor structure of a vehicle body capable of enhancing rigidity against a external force from a side of the vehicle body includes a pair of right and left side sills, a pair of front and rear cross members provided between the pair of right and left side sills, and a floor panel surrounded by the pair of right and left side sills and the pair of front and rear cross members. The floor panel is provided thereover with beads in a concentric arc shape spreading from parts at which the side sills and the cross members are vertically joined to each other. Reinforcement members are provided at corners defined by the side sills and the cross members in such a manner that the reinforcement members are slantingly placed and joined to the side sills and cross members.

16 Claims, 11 Drawing Sheets

FLOOR STRUCTURE OF VEHICLE BODY

CROSS-REFERENCE TO RELATED APPLICATIONS

This application claims the benefit of Japanese Patent Application No. 2005-117951 filed on Apr. 15, 2005 and Japanese Patent Application No. 2005-120520 filed on Apr. 19, 2005, the disclosures of which are incorporated herein by reference.

BACKGROUND OF THE INVENTION

1. Field of the Invention

The present invention relates to a floor structure of a vehicle body for a motor vehicle and the like, particularly to a floor structure of a vehicle body to appropriately distribute a side collision load.

2. Description of the Related Art

A technique has been known as disclosed, for example, in JP-A-H06-107234 as a conventional technique for enhancing rigidity of a floor of a floor structure of a vehicle body including a floor panel for a motor vehicle and the like.

In the floor structure of the vehicle body according to the invention disclosed in JP-A-H06-107234, a floor panel 30, as shown in FIG. 11, has a structure including plural longitudinal beads 31 that extend along the longitudinal direction (rear and front directions) X of a vehicle (not shown in the drawing), and plural lateral beads 32 that extend along the lateral direction (right and left directions) Y of the vehicle (not shown in the drawing). The lateral beads 32 meet the longitudinal beads 31 vertically. The longitudinal beads 31 have a triangular cross section (not shown in the drawing), viewed in the longitudinal direction X of the vehicle. The lateral beads 32 have an approximately rectangular shape in a plan view and have continuous concaves and convexes including bases 32a and apexes 32b in a condition of crossing the longitudinal beads 31. Slope portion 32c are formed around each lateral bead 32, whereby the lateral beads 32 have such a figure that the apex 32b of the beads 32 projects higher above the apex 31b of the longitudinal 31.

In the conventional floor structure of the vehicle body, side sills are joined to the floor panel on both sides thereof, and lateral cross members are joined to the floor panel at the rear and the front thereof, or if necessary in the middle thereof, by welding. More considerations have recently been paid on enhancement in strength against a side collision and on how to distribute this side collision, so as to enhance strength and rigidity of a vehicle. For example, in an invention disclosed in JP-A-2004-314729, cross members provided in the approximately longitudinally middle part of the floor are continuously connected to each other through a tunnel section that is provided in the laterally middle part of the floor. Such a structure enhances strength against the side collision load and distributes this load.

However, when an external force from a side of the vehicle such as a collision load F is inputted, as shown in FIG. 11, the inputted load radially propagates over the floor panel 30 from a part at which the load has been inputted toward the direction indicated by an arrow D in FIG. 11.

In the conventional floor structure of the vehicle body, the longitudinal beads 31 vertically meet the lateral beads 32, and the lateral beads 32 have an approximately rectangular shape having a narrow portion at each corner (apex 32b) in a plan view. Consequently, the conventional floor structure has a disadvantage that deformation easily occurs at the narrow portion of the lateral beads 32 when the collision load F is inputted from the side of the vehicle.

Additionally, in the conventional floor structure of the vehicle body, a joint part between the side sill and the cross member is merely welded in a condition in which an end edge of the cross member abuts onto a side face of the side sill. Hence, the collision load F inputted into the side sill due to a side collision cannot propagate effectively to the cross members. Consequently, the conventional floor structure of the vehicle body has another disadvantage that deformation can easily occur at the joint part between the side sill and the cross member.

As a solution to prevent such deformations, it can be considered to increase a thickness of a component member or to provide a larger reinforcement member so as to enhance strength of the floor structure of the vehicle body. However, this solution increases weight of the vehicle body and may decrease the fuel economy. Therefore, there has been required a floor structure having high rigidity with a lighter weight.

To solve the above disadvantages, it is an object of the present invention to provide a floor structure of a vehicle body capable of enhancing rigidity against external force from a side of a vehicle body, and effectively propagating the external force to cross members.

SUMMARY OF THE INVENTION

An aspect of the present invention provides a floor structure of a vehicle body including a pair of right and left side sills, a pair of front and rear cross members, a floor panel, and beads provided over the floor panel. In the floor structure of the vehicle body of this aspect, the pair of front and rear cross members are provided between the pair of right and left side sills, the floor panel is surrounded by the pair of right and left side sills and the pair of front and rear cross members, and the beads are provided over the floor panel being in a concentric arc shape and spreading from each part at which the side sills and the cross members are vertically joined to each other.

Another aspect of the present invention provides a floor structure of a vehicle body including a pair of right and left side sills, a pair of front and rear cross members, a floor panel and reinforcement members. In the floor structure of the vehicle body of this aspect, the pair of front and rear cross members are provided between the pair of right and left side sills, the floor panel is surrounded by the pair of right and left side sills and the pair of front and rear cross members, and the reinforcement members are provided at corners defined by the pair of side sills and the pair of cross members in such a manner that the reinforcement members are slantingly joined to the side sills and the cross members.

According to the floor structure of the vehicle body of the present invention, it is possible to enhance rigidity against an external force from a side of a vehicle, and to allow a side collision onto a side sill to effectively propagate to cross members. Accordingly, reinforcement members provided on the side sills and the like can be omitted, resulting in reducing the weight of the vehicle.

Other aspect, features and advantages of the present invention will become apparent upon reading the following specification and claims when taken in conjunction with the accompanying drawings.

BRIEF DESCRIPTION OF THE DRAWINGS

FIG. 8A shows a right front part thereof and FIG. 8B shows a left front part thereof.

DETAILED DESCRIPTION OF PREFERRED EMBODIMENT

Detailed explanations will be given on a floor structure of a vehicle body according to the present invention hereinafter.

First Embodiment

With reference to drawings, explanations will be given on a floor structure of a vehicle body according to a first embodiment of the present invention.

Note that rear and front directions (or a longitudinal direction), and right and left directions (or a lateral direction) used in the explanation are based on a condition in which a floor panel that is a principle component of the floor structure of the vehicle body is provided with a pair of right and left side sills and a pair of rear and front cross members, both of which constitutes the vehicle body. These directions are based on a driver's view direction, as well.

Figure 1:
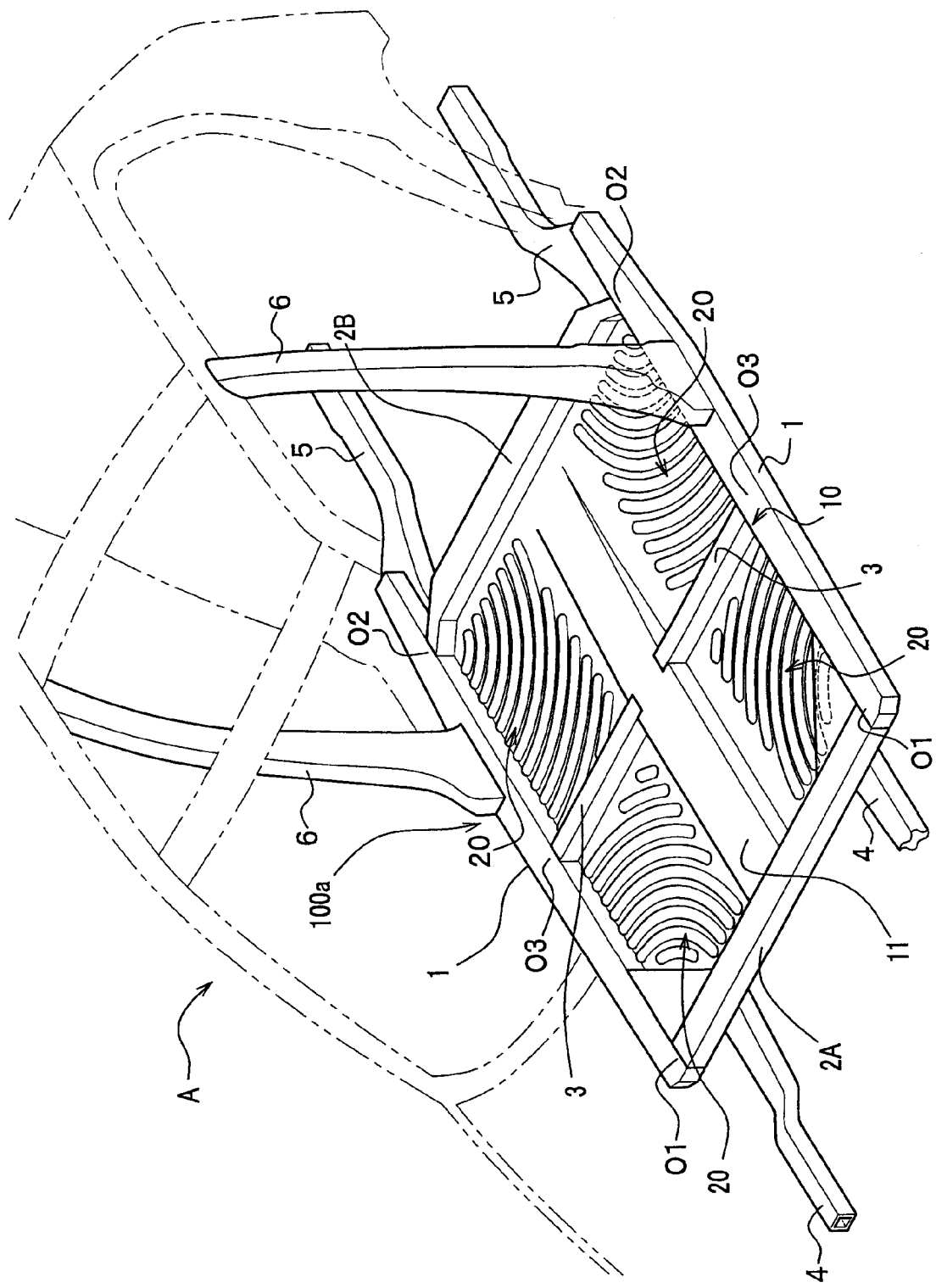
FIG. 1 is a general perspective view showing a vehicle body structure around a vehicle compartment to explain a floor structure of the vehicle body according to the first embodiment of the present invention.
Figure 2:
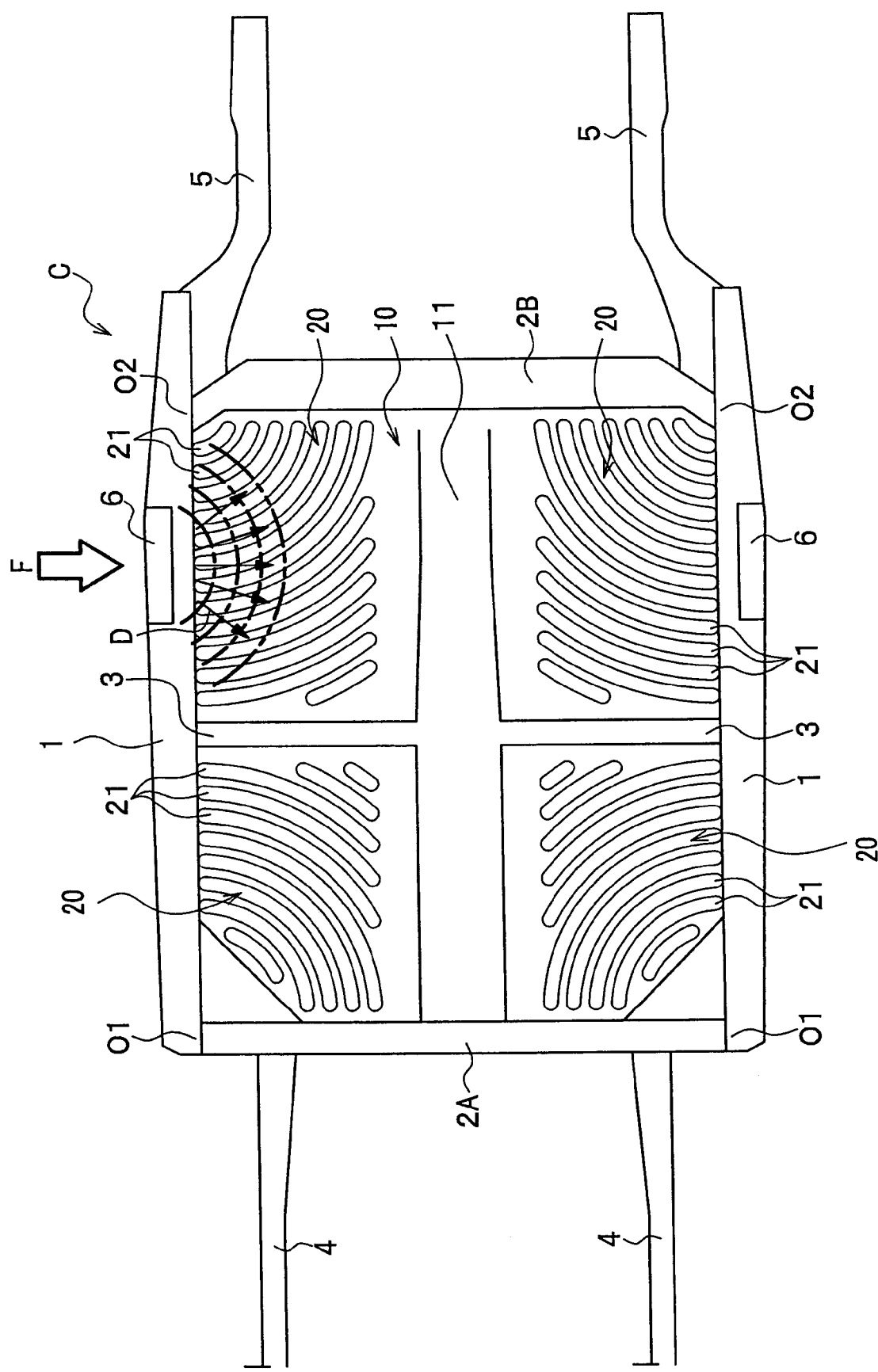
FIG. 2 is a plan view showing principal components of the vehicle body.

FIG. 1 is a perspective view of a vehicle body structure around a vehicle compartment to explain details of the floor structure of the vehicle body according to the first embodiment. FIG. 2 is a plan view showing principle components of the vehicle body.

As shown in FIG. 1 the floor structure of the vehicle body 100a includes a pair of right and left side sills 1, 1 provided on right and left sides of the vehicle body A, a front cross member 2A and a rear cross member 2B each of which is bridged between the right and left side sills 1, 1, and a floor panel 10 having an approximately rectangular shape surrounded by the pair of the side sills 1, 1, the front cross member 2A and the rear cross member 2B.

The floor panel 10 is reinforced by a floor tunnel 11 extendedly provided in the longitudinal direction between the front cross member 2A and the rear cross member 2B at each center thereof.

The floor panel 10 is also reinforced by cross members 3, 3 laterally provided between the side sills 1, 1 and the floor tunnel 11 so as to connect the right and left side sills 1, 1 and the floor tunnel 11 at each center thereof.

Each of the right and left side sills 1, 1, the front cross member 2A, the rear cross member 2B and the floor cross members 3, 3 has a closed section formed by more than one component member.

There are two front seats (not shown in the drawing) placed above the approximately middle part of the floor panel 10 (i.e. approximately above the floor cross members 3, 3), and there are a rear seat or seats (not shown in the drawing) placed approximately above the rear part of the panel 10 (approximately above the rear cross member 2B).

A pair of right and left front side frames 4, 4 is extendedly provided before the front cross member 2A, and a pair of right and left rear side frames 5, 5 is extendedly provided behind the rear cross member 2B. Rear ends of the right and left front side frames 4, 4 are joined respectively to the right and left side sills 1, 1 at front parts thereof (not shown in the drawing). Front ends of the right and left rear side frames 5, 5 are joined respectively to the right and left side sills 1, 1 at rear parts thereof.

The right and left side sills 1, 1 are provided on the both sides of the floor panel 10 in the longitudinal direction of the vehicle body A, and the floor panel 10 is joined to the inside face of the side sills 1, 1 by welding and the like. A pair of center pillars 6, 6 is fixed respectively onto the right and left side sills 1, 1 at positions behind positions O3, O3 at which the floor cross members 3, 3 are joined respectively to the right and left side sills 1, 1. The right and left side sills 1, 1 are sometimes separately provided adjacent to floor frames that are longitudinally provided on the both sides of the floor panel 10. However, in the first embodiment of the present invention, one side sill 1 is explained as a component member integrally formed with the floor frames, which are longitudinally provided on the both sides of the floor panel 10.

Although details are omitted in the drawing, the center pillars 6, 6 are constituted in a closed section by a pillar outer and a pillar inner, both of which have an approximately hat-shaped cross section. Each of the center pillars 6, 6 is reinforced by a pillar reinforcement provided inside the closed section of the corresponding center pillar 6.

As mentioned above, the floor panel 10 is surrounded by the pair of right and left side sills 1, 1, the front cross member 2A and the rear cross member 2B. The floor panel 10 includes four panel faces in the back and the front on the right and left sides, partitioned by the floor tunnel 11 and the floor cross members 3, 3.

In the first embodiment, plural beads 20 in a concentric arc-shape are projectingly formed over each panel faces. The plural beads 20 are concentrically formed at equal intervals from parts O1, O1 (corners) at which the side sills 1, 1 and the front cross member 2A are vertically joined to each other, and from parts O2, O2 (corners) at which the side sill 1, 1 and the rear cross member 2B are vertically joined to each other. In other words, the beads 20 are formed in waveforms over each panel face in such a manner that they spread thereover from each of the four corners of the floor panel 10. Note that the vertical joint parts O1, O1 and O2, O2 include adjacent portions thereof.

The above formed beads 20, as shown in FIG. 2, are arranged in such a manner that ends 21 of the beads are placed vertically to the side sill 1, and the beads 20 spread in arc wave forms toward the center of the floor panel 10. Adjacent to the front cross member 2A and the rear cross member 2B, the beads 20 spread toward the cross members 2A and 2B in arc wave forms. This means the beads 20 are formed over the floor panel 10 along the approximately same direction in which a collision load F inputted through the side sill 1 propagates (as indicated by the arrow D of the FIG. 2).

Figure 3:
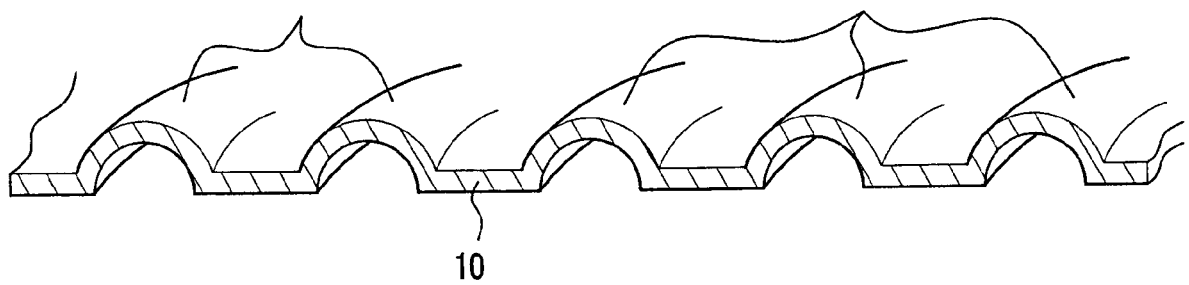
FIG. 3 is a cross section view of beads.

In the first embodiment, the beads 20 are formed in such a manner that the beads 20 spread across the approximately entire area of each panel face of the floor panel 10. As shown in FIG. 3, the beads 20 have a semi-circular cross section with a same thickness as that of the panel face.

Chiefly referring to FIG. 2, an explanation will be given on an operational effect when the collision load F is inputted into the side sill 1 of the floor structure of the vehicle body 100a, as mentioned above. The explanation will be made in the case that the collision load F is inputted through the center pillar 6 into the side sill 1 as follows.

As shown in FIG. 2, when the collision load F due to a side collision and the like is inputted through the center pillar 6 into the side sill 1, the load F propagates from an lower end of the center pillar 6 into the side sill 1, and then across the floor panel 10 radically (as indicated by the arrow D), that is, the collision load F spreads across the floor panel 10 in waveforms, as indicated by two dot chain lines in FIG. 2.

As mentioned above, since the beads 20 are formed in concentric arc forms over each panel face of the floor panel 10, and spread from the part O2, for example, the load F propagating across the floor panel 10 is received by the plural beads 20. Specifically, the beads 20 are arranged in such a manner that the beads 20 spread to approximately vertically meet the propagating waves of the load F. Therefore, the beads 20 oppositely bear against the collision load F, so that deformation of the floor panel 10 can be reduced. The inventors of the present invention carried out simulation tests to confirm this effect of the beads 20 as follows.

As shown in FIGS. 4A to 4D, the simulation tests were carried out in such a manner that forced displacement was applied to each vehicle body from the outside toward the inside of the body at a speed of 14 m/sec, and loads applied to a portion corresponding to the floor tunnel 11 were measured. First, a simulation test was conducted by using a test floor panel 10 (see FIG. 4A) having the same thickness as that of the above mentioned floor panel 10.

Figure 4D:
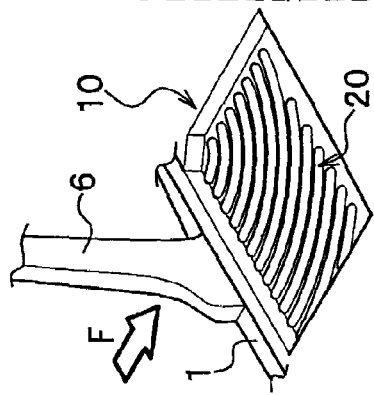
FIGS. 4A to 4D are drawings to explain simulation tests.

As comparative examples, there were also prepared: a floor structure of a vehicle body incorporating a floor panel 10A having no beads thereover (see FIG. 4B); a floor structure of a vehicle body incorporating a floor panel 10B having laterally liner beads 20B thereover (see FIG. 4C); and a floor structure of a vehicle body incorporating a floor panel 10C having longitudinally liner beads 20C thereover (see FIG. 4D). Measurements were made on these comparative examples, as well. FIG. 4E shows results of the measurements.

Figure 4C:
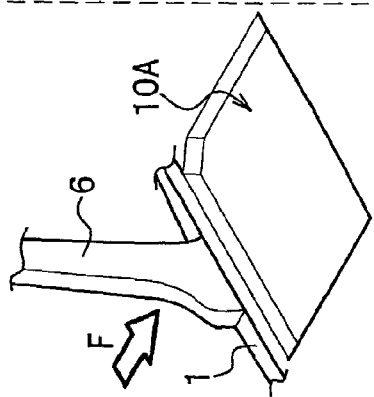
Figure 4B:
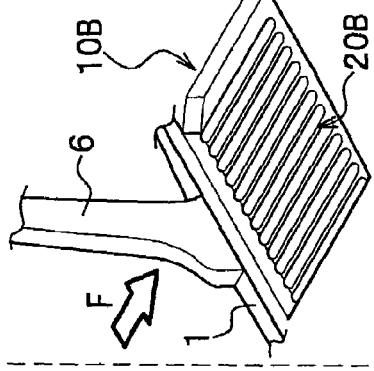
Figure 4A:
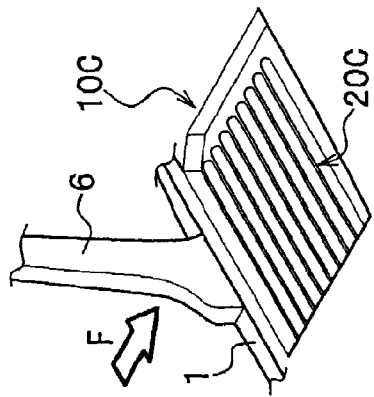
Figure 4E:
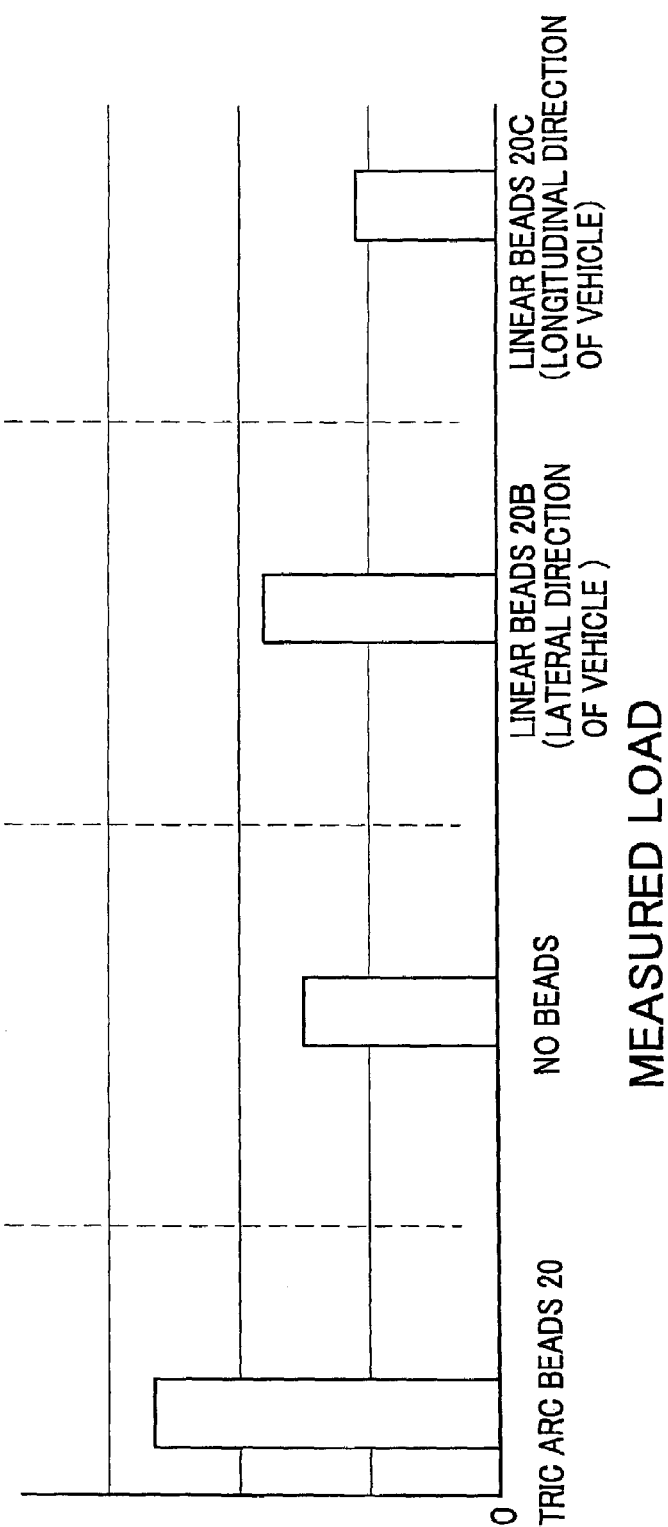
FIG. 4E shows results of the measurement on the tests.

Comparing the floor structure of the vehicle body 100a according to the first embodiment as shown in FIG. 4A to those bodies as shown in FIGS. 4B to 4D, it is obvious in the FIG. 4E that floor structure of the vehicle body 100a had a measured value of load which was significantly greater than those of the comparative examples, which indicates that rigidity of the floor panel 10 was enhanced effectively. It should be noted that the floor structure of the vehicle body 100a could obtain enhanced rigidity 1.5 times greater than that of the floor panel 10B in FIG. 4C having the liner beads 20B thereover were oriented partially along the propagating direction of the side collision load F.

As described above, the floor structure of the vehicle body 100a according to the first embodiment incorporates the floor panel 10 surrounded by the pair of right and left side sills 1, 1, the front cross member 2A and the rear cross member 2B, and the beads 20 are arranged over this floor panel 10 in such a manner that the beads 20 are oriented along the propagating direction of the side collision load F inputted through the side sill 1, 1. Therefore, the beads 20 oppositely bear against the collision load F, so as to reduce the deformation of the floor panel 10. Accordingly, it is possible to resist the side collision load F inputted from a side of the vehicle body, resulting in enhanced rigidity of the floor structure of the vehicle body.

The plural beads 20 arranged at equal intervals provide stresses against the collision load F to prevent local deformation of the floor panel 10.

Furthermore, the floor panel 10 is reinforced by the floor tunnel 11 which longitudinally extends in the laterally middle part of the vehicle body A, resulting in further enhanced rigidity of the floor structure of the vehicle body.

The floor panel 10 is further reinforced by fixing the floor cross members 3, 3 at least at the ends thereof to the right and left side sills 1, 1, whereby the collision load F inputted into the side sill 1, 1 can be preferably resisted, resulting in much further enhanced rigidity of the floor structure of the vehicle body.

Second Embodiment

With reference to drawings, explanations will be given on a floor structure of a vehicle body according to a second embodiment.

Note that, in the explanations on the second embodiment, the same components of the second embodiment as those of the first embodiment are denoted by the same numeral references of the first embodiment.

Figure 7:
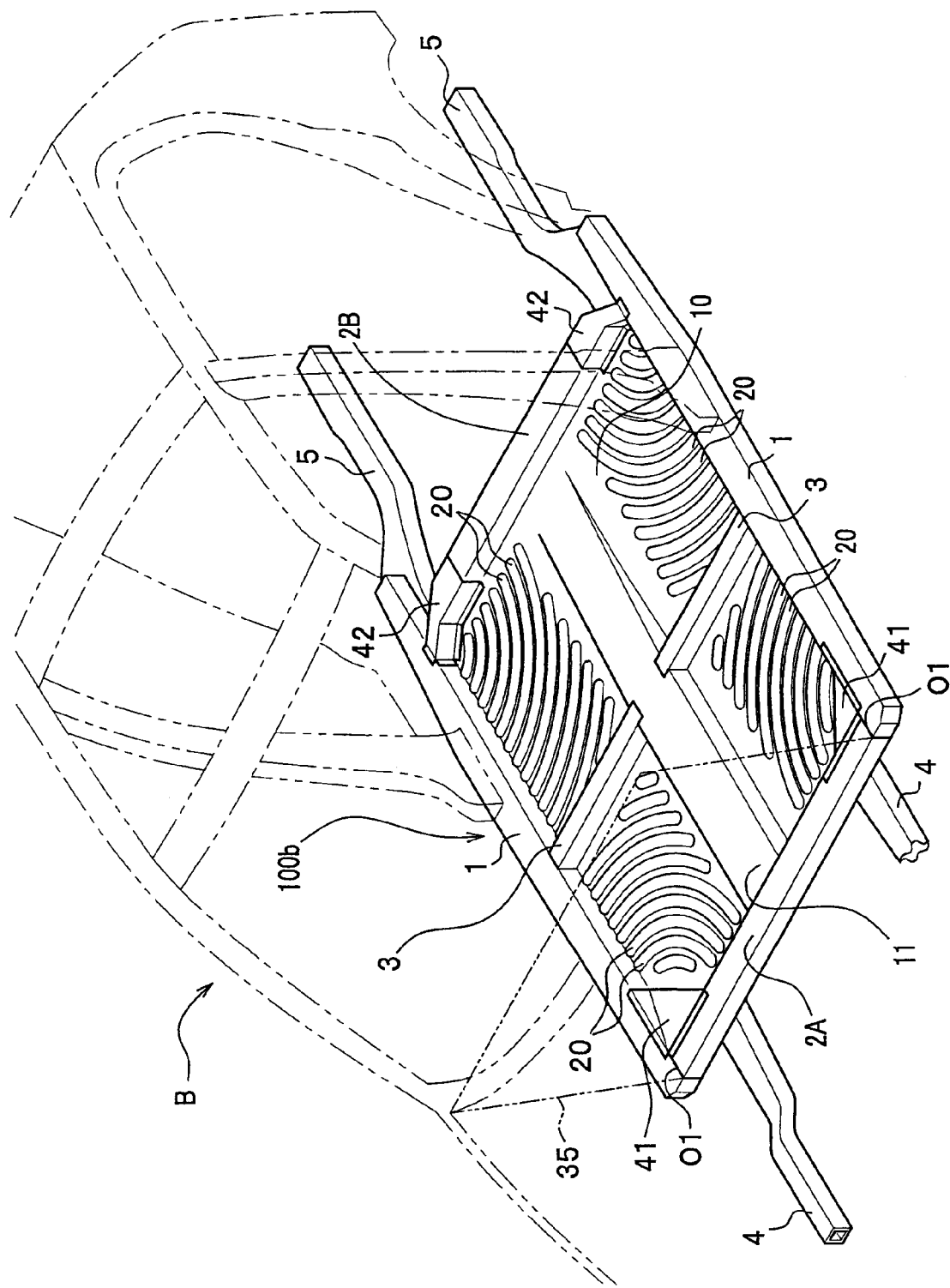
FIG. 7 is a general perspective view of a floor structure of a vehicle body according to the second embodiment.
Figure 8A:
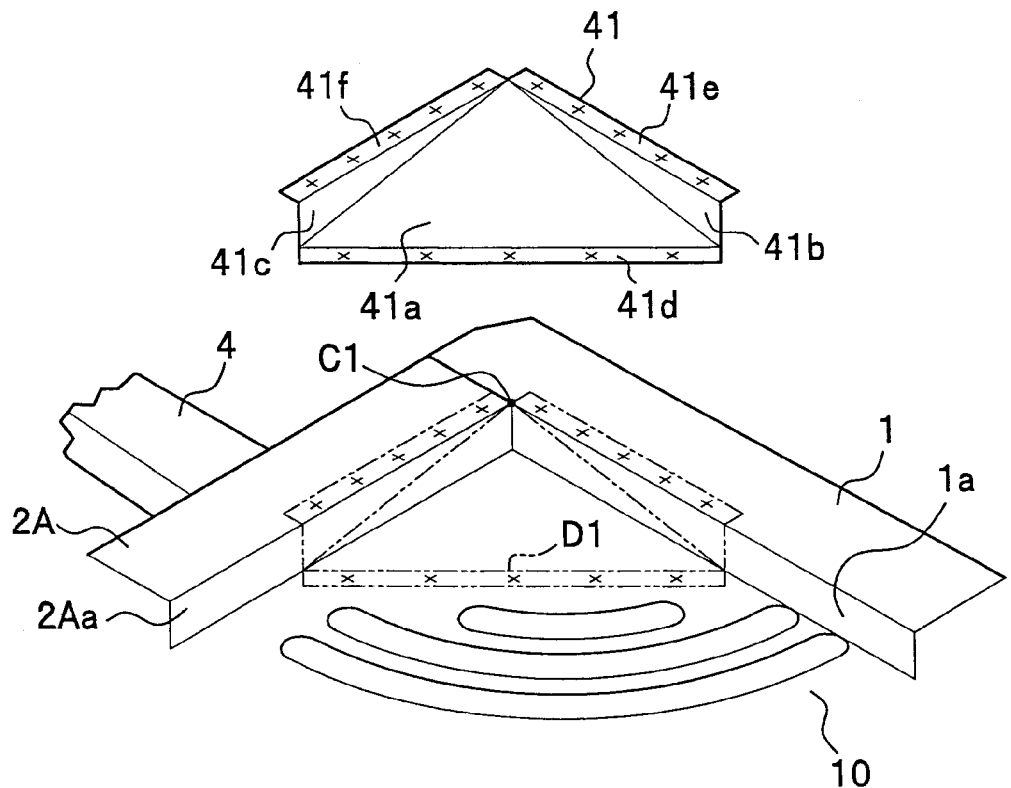
FIGS. 8A and 8B are partially enlarged perspective views of FIG. 1.
Figure 8B:
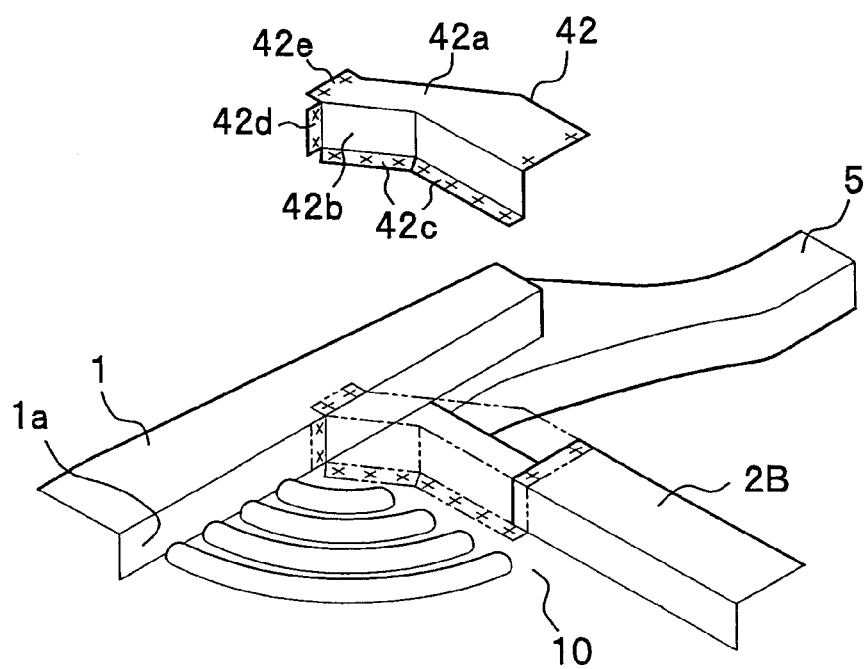

FIG. 7 is a general perspective view showing the floor structure of a vehicle body 100b according to the second embodiment. FIGS. 8A and 8B are partially enlarged perspective views. FIG. 8A is a right front side of the floor structure of the vehicle body 100b, and FIG. 8B is a left front side thereof. As in the first embodiment, rear and front directions (or longitudinal direction), and right and left directions (or lateral direction) used in the explanation in the second embodiment are based on a condition in which a floor panel 10 that is a principle component of the floor structure of the vehicle body is provided with a pair of right and left side sills and to a pair of rear and front cross members, both of which constitutes the vehicle body. These directions are based on a driver's view direction, as well.

As shown in FIG. 7, the floor structure of the vehicle body 100b of a vehicle body B includes a floor panel 10 constituting a floor of the vehicle compartment, a pair of right and left side sills 1, 1 respectively joined to a right and left sides of the floor panel 10, and plural cross members extendedly provided in the lateral direction of the vehicle. Each of the side sills 1, 1 and the cross members has a closed section formed by more than one component member.

The cross members according to the second embodiment includes a front cross member 2A joined to a lower end of a dash panel in a front part of the floor panel 10, floor cross members 3, 3 laterally extending around a longitudinally middle part of the floor panel 10, that is, at a location corresponding to a position under front seats (not shown in the drawing), and a laterally extending rear cross member 2B which is joined to a rear part of the floor panel 10. Each of the cross members is placed vertically to corresponding side sill 1, and the right and left side sills 1, 1, the front cross member 2A and the rear cross member 2B form a rectangular frame in a plan view. The front cross member 2A may be formed as a dash cross member, which is formed integrally along with the dash panel 35 serving as a partition between the vehicle compartment and a bonnet section. The pair of side sills 1, 1 is sometimes separately provided adjacent to floor frames that are longitudinally provided on the both sides of the floor panel 10. However, in the second embodiment of the present invention, one side sill 1 is explained as a component member integrally formed with the floor frames, which are longitudinally provided on the both sides of the floor panel 10.

A floor tunnel 11 is formed in a laterally middle part of the floor panel 10 to enhance rigidity of the floor panel 10. On the lower face of the floor panel 10, two front side members 4, 4 extending forwards are joined to two rear side members 5, 5 extending backwards.

First reinforcement members 41, 41 are slantingly provided at corners O1, O1 at which the right and left side sills 1, 1 and the front cross member 2A are joined to each other.

One first reinforcement member 41, as shown in FIG. 8A, includes a slope face portion 41a, a side wall 41b and a front wall 41c. The side wall 41b continued from the slope face portion 41a extends in contact along an inside face 1a (face on the vehicle compartment side) of the side sill 1. The front wall 41c continued from the slope face portion 41a extends in contact along an inside face 2Aa (face on the vehicle compartment side) of the front cross member 2A.

The slope face portion 41a is formed along a plane face extending from a line D1 on the floor panel 10 which slantingly connects the side sill 1 and the front cross member 2A to a joint point C1 on upper faces of the side sill 1 and the front cross member 2A. In other words, the slope face portion 41a is provided inclininingly at a corner defined by the inside face 1a of the side sill 1, the inside face 2Aa of the front cross member 2A and the floor panel 10, so that a tetrahedron is formed along with these component members.

A flange 41d extending along the floor panel 10 is formed at a lower end of the slope face portion 41a, a flange 41e extending along the upper face of the side sill 1 is formed at an upper end of the side wall 41b, and a flange 41f extending along the upper face of the front cross member 2A is formed at an upper end of the front wall 41c.

Each of the flanges 41d, 41e and 41f is spot-welded respectively on the floor panel 10, the side sill 1 and the front cross member 2A at a corresponding mark "+".

The other first reinforcement member 41 symmetrical to the above mentioned first reinforcement member 41 is also provided at a left front joint part at which the side sill 1 and the front cross member 2A are joined to each pother.

The first reinforcement members 41, 41 are provided at the corners defined by the side sills 1, 1 and the front cross member 2A, so as to reinforce these joint parts. The shape of the first reinforcement members 41, 41 is not limited to that in FIG. 8A. The first reinforcement members 41, 41 may extend toward the front side member 4 and be welded thereon.

As shown in FIG. 7, second reinforcement members 42, 42 are inclininingly provided and joined at corners at which the right and left side sills 1, 1 and the rear cross member 2B are joined to each other.

The rear cross member 2B is disconnected from each end of the side sills 1, 1, and one second reinforcement member 42 is formed in such a manner that the reinforcement member 42 laterally extends toward and slantingly connects to the side sill 1.

As shown in FIG. 8B, the second reinforcement member 42 includes an upper face portion 42a and a front wall 42b. The upper face portion 42a has a potion on the laterally middle side of the vehicle which extends along the upper face of the rear cross member 2B and a portion on the side sill 1 side which slantingly extends forward. The front wall 42b extends downward from a front end of the upper face portion 42a.

Flanges 42c, 42d and 42e are formed on the second reinforcement member 42 respectively in such a manner that the flange 42c extends along the floor panel 10 from the lower end of the front wall 42b, the flange 42d extends forward along the inside face 1a of the side sill 1 on either side of the vehicle, and the flange 42e continues from the portion of the upper face portion 42a on the side sill 1 side along the upper face of the side sill 1. The flanges 42c, 42d and 42e are spot-welded respectively on the floor panel 10, the inside face 1a of the side sill 1 and the upper face of the side sill 1 at a corresponding mark "+". The other second reinforcement member 42, symmetrical to the above mentioned second reinforcement member 42, is also provided at a left rear joint part at which the side sill 1 and the rear cross member 2B are joined to each other.

The second reinforcement members 42, 42 are provided at the corners defined by the side sills 1, 1 and the rear cross member 2B, so as to reinforce these joint parts.

The floor panel 10 according to the second embodiment is provided thereover with the same beads 20 in the same manner as in the first embodiment. As shown in FIG. 7, the floor panel 10 is provided thereover with the plural beads 20 in a concentric arc-shape which spread from parts O1, O1 (corners) at which the side sill 1 and the front cross member 2A are vertically joined to each other. The plural beads 20 in a concentric arc-shape are also provided in such a manner that they spread from parts O2, O2 (corners) at which the side sill 1 and the rear cross member 2B are vertically joined to each other. Each of these beads 20 typically has a semi-circular cross section, and may have a trapezoid shape or a reversely U shape cross section as well.

An explanation will be given on an operational effect of the floor structure of the vehicle body according to the second embodiment as mentioned above.

Figure 9:
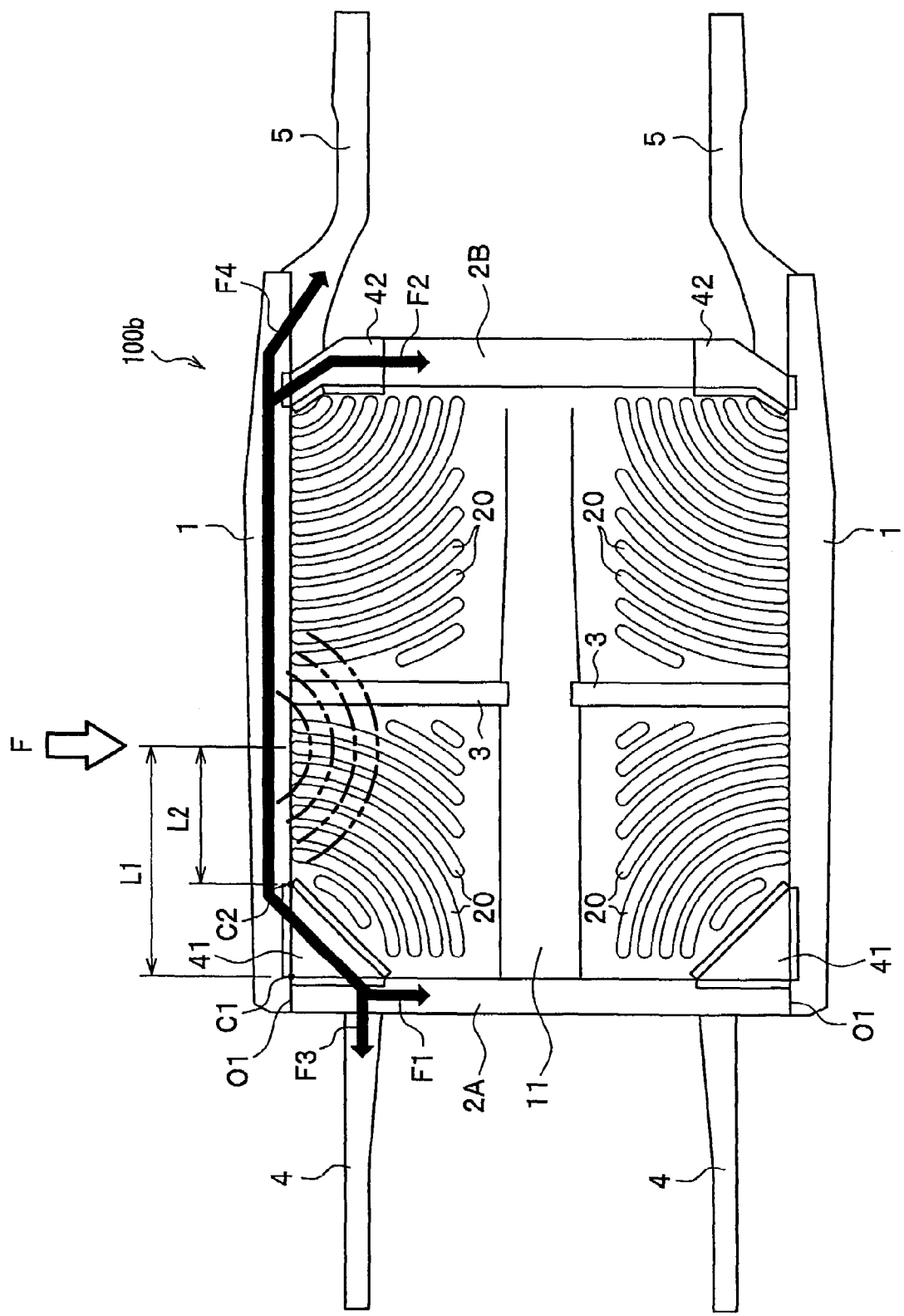
FIG. 9 is a plan view of the floor structure according to the second embodiment to explain an operation of the floor structure.

FIG. 9 is a plan view to explain an operation of the floor structure of the vehicle body 100b according to the second embodiment.

The floor structure of the vehicle body 100b according to the second embodiment is structured in a rectangular form defined by the side sills 1, 1, the front cross member 2A and the rear cross member 2B. The front corners of the rectangular floor are reinforced by the first reinforcement members 41, 41, each of which slantingly joins the side sill 1 and the front cross member 2A. Accordingly, strength and rigidity at the front corners are assured, so as to reduce distortion between the side sills 1, 1 and the front cross member 2A. The rear corners of the rectangular floor are reinforced by the second reinforcement members 42, 42 each of which slantingly joins the side sill 1 and the rear cross member 2B. Accordingly, strength and rigidity at the rear corners are assured, so as to reduce distortion between the side sills 1, 1 and the rear cross member 2B.

As shown in FIG. 9, if the side collision load F indicated by a bold arrow F1 is inputted from the side of the vehicle body B due to a vehicle collision, etc., this collision load is allowed to easily propagate from the side sill 1 through the first reinforcement 41 to the front cross member 2A. At this time, the first reinforcement 41 works as a prop brace between the front cross member 2A and the side sill 1 and oppositely bears against the collision load, so as to reduce bending of the side sill 1 at the joint point, as a fulcrum, at which the side sill 1 and the front cross member 2A are joined to each other.

To be specific, in the case without the first reinforcement member 41, when the side sill 1 is bended at the joint point C1, as a fulcrum, between the side sill 1 and the front cross member 2A, a distance L1 between an point of application and the joint point C1 becomes longer. This means that a bending moment applied to the front part of the side sill 1 becomes greater. To the contrary, in the case with the fist reinforcement member 41, propping force by the first reinforcement member 41 shifts the fulcrum to the joint point C2 to, so that the distance L2 to the point of application becomes shorter, resulting in a smaller bending moment to be applied to the side sill 1.

Similarly to the case of the bold arrow F1, as indicated by a bold arrow F2, the side collision load F is allowed to easily propagate from the side sill 1 through the first reinforcement 42 to the rear cross member 2B. In this case, the second reinforcement member 42 provides a propagating route allowing the collision load to propagate moderately between the rear cross member 2B and the side sill 1. Accordingly, the collision load inputted into the side sill 1 is effectively conducted to the rear cross member 2B, so as to reduce bending of the side sill 1.

The side collision load F propagates over the floor panel 10 in waveforms as indicated by two bold dot lines in FIG. 9. Similarly to the case in the first embodiment, the load applied to the floor panel 10 can be received by the plural beads 20 in a concentric arc shape spreading from each of the corners at which the side sills 1, 1 and the above mentioned cross members 2A and 2B are vertically joined to each other. In other words, the beads 20 are oriented in the direction vertically meeting the two dot lined waveforms of the collision load F, whereby the beads 20 can oppositely bear against the collision load F so as to reduce deformation of the floor panel 10. This means that the beads 20 conduct the side collision load F to the front cross member 2A and the rear cross member 2B.

As indicated by the arrows F3 and F4, the side collision load F propagating through the first and second reinforcement members 41 and 42 works not to bend the side sill 1, and thus effectively propagates to the front side member 4 and the rear side member 5.

The first and second reinforcement members 41 and 42 reduce bending of the side sill 1, and the side sill 1, the front cross member 2A and the rear cross member 2B constitute a rahmen structure serving as a thick plate, and work to reduce deformation of each components of the vehicle body B, so as to improve rigidity thereof. Moreover, the side collision load F is allowed to effectively propagate (be distributed) through the first and second reinforcement members 41 and 42 to the front cross member 2A and the rear cross member 2B. As a result, it is possible to reduce deformation of the side sill 1, the front cross member 2A, the rear cross member 2B and the floor panel 10 constituting the floor structure of the vehicle body 100*b*.

The present invention is not limited to the embodiments as explained above, and can be appropriately modified and practiced according to the spirit of the present invention.

Figure 5A:
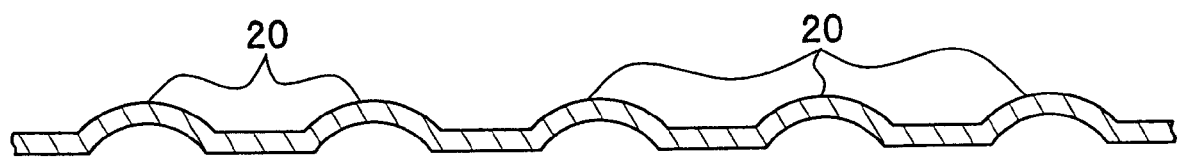
FIGS. 5A to 5C are cross sections to show modifications of the beads.
Figure 5B:
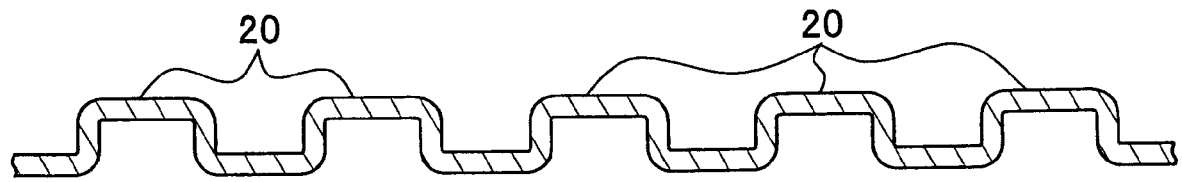
Figure 5C:
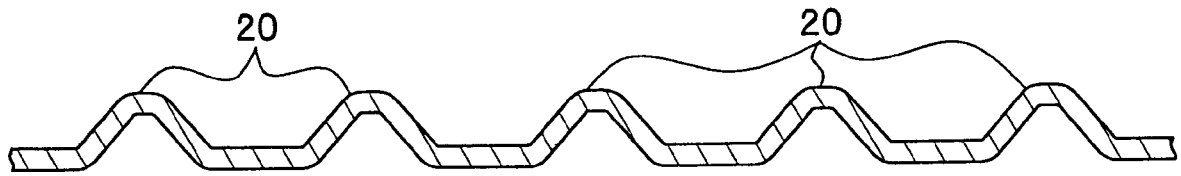

For example, in the first embodiment, the beads 20 may have projections in an arc shape shallower than a semicircular shape, as shown in FIG. 5A, may have a rectangular cross section in FIG. 5B, or may have an approximately triangular cross section in FIG. 5C.

Figure 6:
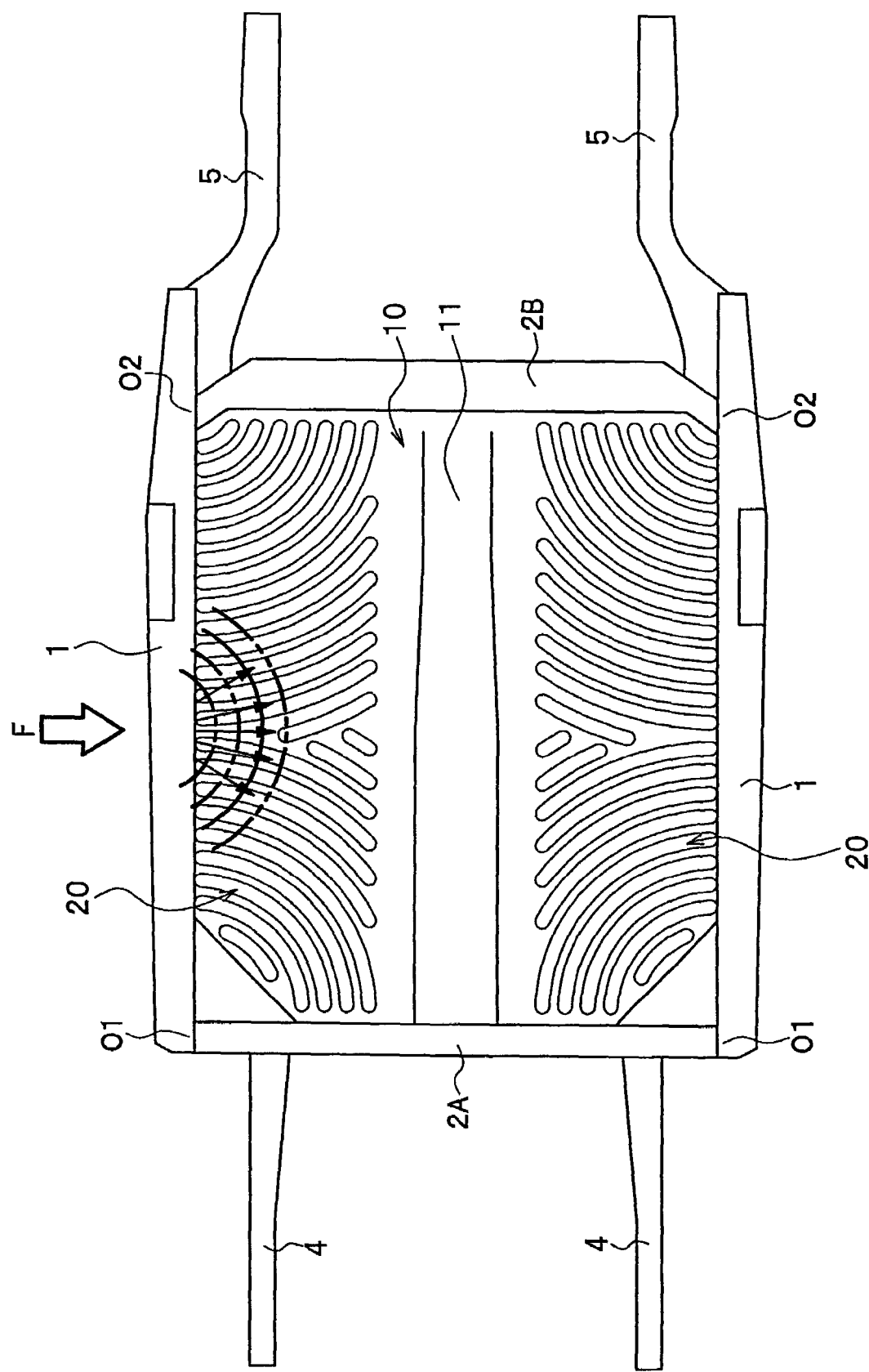
FIG. 6 is a plan view showing another example of the principal component of the vehicle body.

The floor panel 10 may be provided thereover with the beads 20 in a concentric arc shape without providing floor cross members thereon, as shown in FIG. 6. In this case, the beads 20 can be arranged along the propagating direction of the collision load F, so that the beads 20 can oppositely bear against the collision load F so as to reduce deformation of the floor panel 10.

In the second embodiment, the rear cross member 2B has a gap between the side sill 1, and is joined thereto via the second reinforcement 42. However, the cross member 2B may be joined directly to the side sill 1.

Figure 10A:
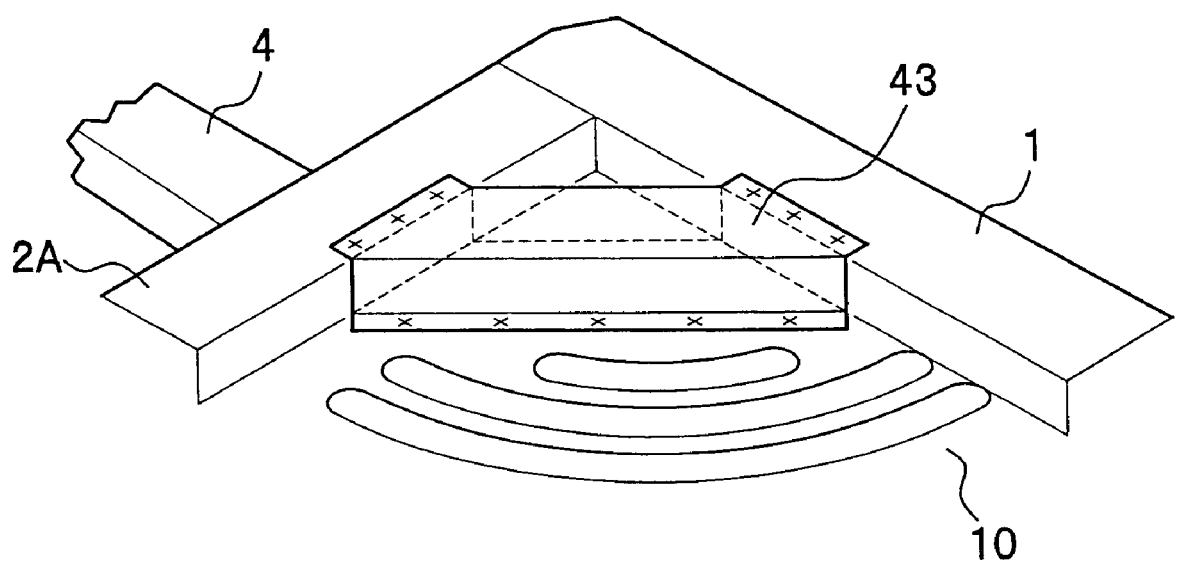
FIGS. 10A and 10B are enlarged perspective views to show modifications of the first reinforcement member.
Figure 10B:
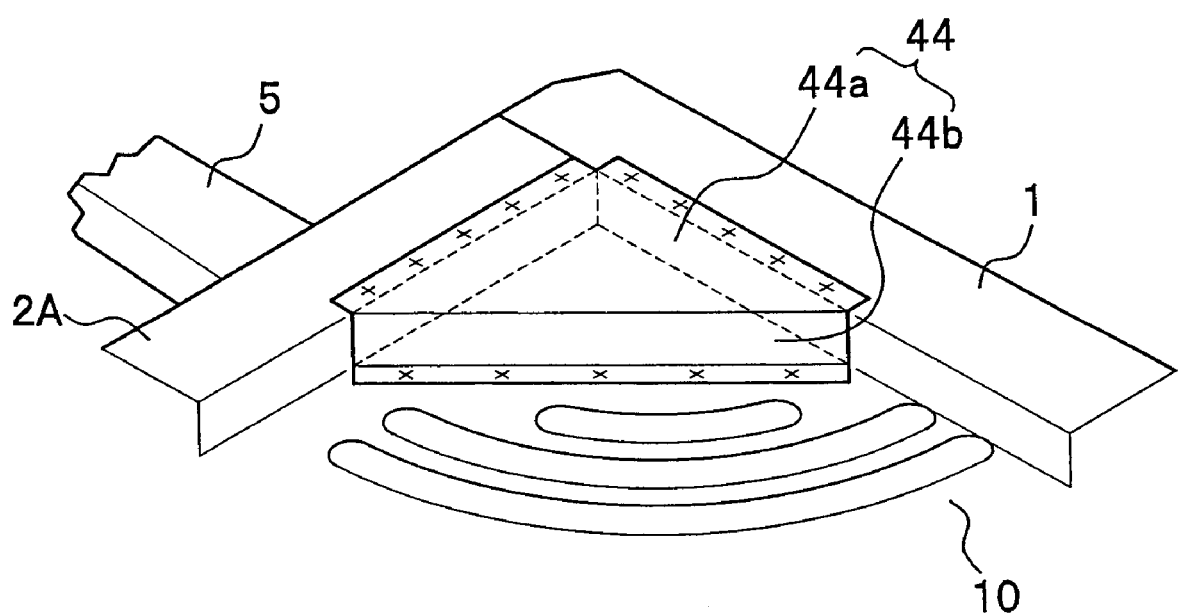
Figure 11:
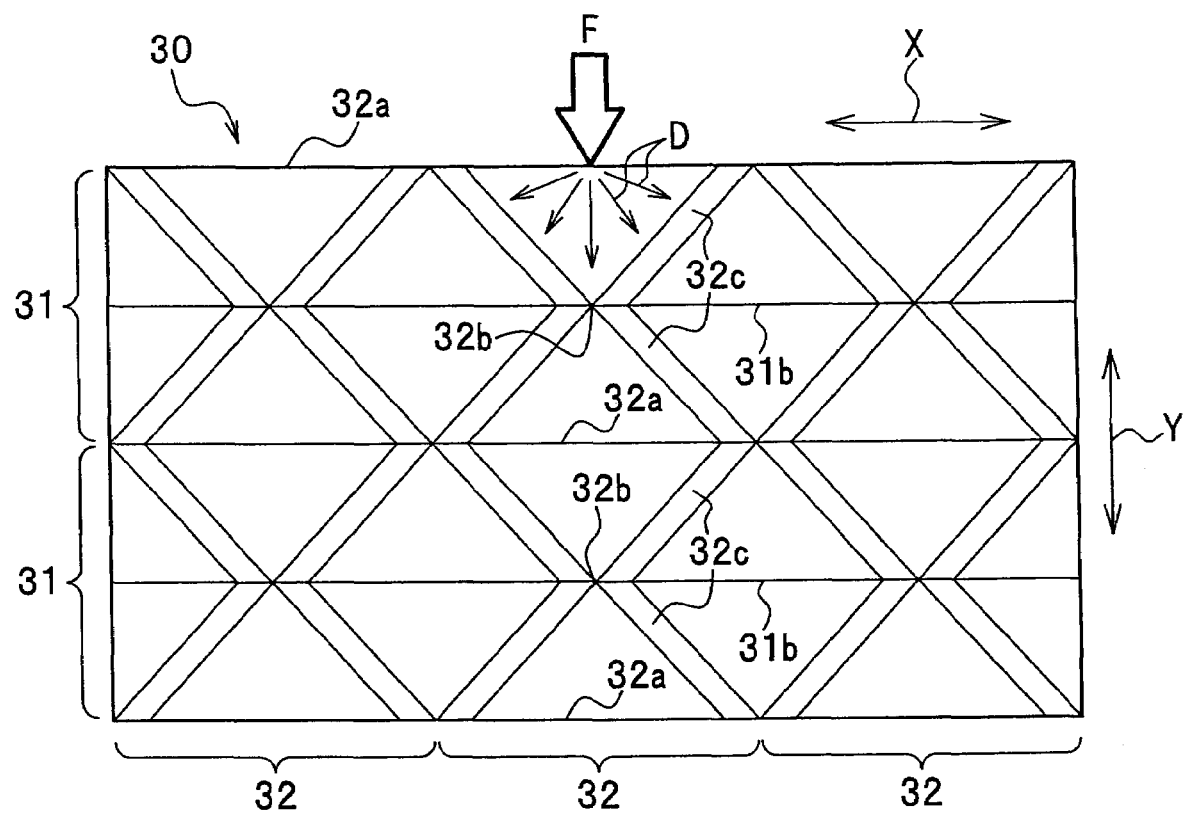
FIG. 11 is a drawing to explain a prior art.

FIGS. 10A and 10B show enlarged perspective views of modifications of the first reinforcement member. In the second embodiment, the first reinforcement member 41 has the slope face portion 41*a*. However, a modified first reinforcement member 43 may have a long hat-shaped cross section, as shown in FIG. 10A, and be slantingly provided relative to the side sill 1 and the front cross member 2A so as to join the side sill 1 and the front cross member 2A. The beads 20 may be omitted from the floor panel 10.

As shown in FIG. 10B, another modified first reinforcement members 44 may have a triangular upper face portion 44*a* corresponding to a corner defined by the side sill 1 and the front cross member 2A instead of the slope face portion 41*a*, and have a sidewall 44*b* extending perpendicularly downward from the triangular upper face portion 44*a* so as to slantingly connect the side sill 1 and the front cross member 2A.

Nevertheless, these modified first reinforcement members 43 and 44 have larger areas projecting toward the vehicle compartment and occupying more room thereof. Therefore, the first reinforcement member 41 having the slope face portion 41*a* according to the above mentioned embodiment can both ensure sufficient room for the vehicle compartment and sufficient reinforcement effect on the vehicle body.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A floor structure of a vehicle body comprising a pair of right and left side sills, a pair of front and rear cross members, a floor panel, and beads provided over the floor panel; and the pair of front and rear cross members being provided between the pair of right and left side sills, the floor panel surrounded by the pair of right and left side sills and the pair of front and rear cross members, and the beads provided over the floor panel being in a concentric arc shape and spreading from each part at which the side sills and the cross members are vertically joined to each other.

2. The floor structure of the vehicle body according to claim 1, wherein the beads in a concentric arc shape are provided at equal intervals.

3. The floor structure of the vehicle body according to claim 1 further comprising a floor tunnel extendedly provided in a laterally middle part of the vehicle body so as to reinforce the floor panel.

4. The floor structure of the vehicle body according to claim 2 further comprising a floor tunnel extendedly provided in a laterally middle part of the vehicle body so as to reinforce the floor panel.

5. The floor structure of the vehicle body according to claim 1 further comprising floor cross members at least of which ends are fixed to the pair of right and left side sills so as to reinforce the floor panel.

6. The floor structure of the vehicle body according to claim 2 further comprising floor cross members at least of which ends are fixed to the pair of right and left side sills so as to reinforce the floor panel.

7. The floor structure of the vehicle body according to claim 3 further comprising floor cross members at least of which ends are fixed to the pair of right and left side sills so as to reinforce the floor panel.

8. The floor structure of the vehicle body according to claim 4 further comprising floor cross members at least of which ends are fixed to the pair of right and left side sills so as to reinforce the floor panel.

9. A floor structure of a vehicle body comprising a pair of right and left side sills, a pair of front and rear cross members, a floor panel, reinforcement members, and beads provided over the floor panel; and
  the pair of front and rear cross members being provided between the pair of right and left side sills,
  the floor panel being surrounded by the pair of right and left side sills and the pair of front and rear cross members,
  the reinforcement members being provided at corners defined by the pair of side sills and the pair of cross members in such a manner that the reinforcement members are slantingly joined to the side sills and the cross members, and
  the beads being provided in a concentric arc shape and spread from each part at which the side sills and the cross members are vertically joined to each other.

10. The floor structure of the vehicle body according to claim 9, wherein the reinforcement members are further joined to the floor panel.

11. The floor structure of the vehicle body according to claim 9, wherein at least one of the reinforcement members has a slope face portion inclining relative to the floor panel, and is provided at a corresponding corner to form a tetrahedron along with an inside face of at least one of the side sill, an inside face of at least one of the cross members and the floor panel.

12. The floor structure of the vehicle body according to claim 10, wherein at least one of the reinforcement members has a slope face portion inclining relative to the floor panel, and is provided at a corresponding corner to form a tetrahedron along with an inside face of at least one of the side sill, an inside face of at least one of the cross members and the floor panel.

13. The floor structure of the vehicle body according to claim 9, wherein the beads in a concentric arc shape are provided at equal intervals.

14. The floor structure of the vehicle body according to claim 10, wherein the beads in a concentric arc shape are provided at equal intervals.

15. The floor structure of the vehicle body according to claim 11, wherein the beads in a concentric arc shape are provided at equal intervals.

16. The floor structure of the vehicle body according to claim 12, wherein the beads in a concentric arc shape are provided at equal intervals.

* * * * *